United States Patent
Su et al.

(10) Patent No.: US 12,427,666 B2
(45) Date of Patent: Sep. 30, 2025

(54) AUTOMATIC DEVICE AND SAFETY APPARATUS THEREOF

(71) Applicant: MECHAVISION INC., Taipei (TW)

(72) Inventors: Jui-Yiao Su, New Taipei (TW);
Chang-Ho Liou, Hsinchu (TW);
Yuan-Li Lu, New Taipei (TW);
Shin-Ming Cheng, Zhubei (TW)

(73) Assignee: MECHAVISION INC., Taipei (TW)

( * ) Notice: Subject to any disclaimer, the term of this patent is extended or adjusted under 35 U.S.C. 154(b) by 667 days.

(21) Appl. No.: 17/784,676

(22) PCT Filed: Dec. 13, 2019

(86) PCT No.: PCT/CN2019/125118
§ 371 (c)(1),
(2) Date: Dec. 21, 2022

(87) PCT Pub. No.: WO2021/114223
PCT Pub. Date: Jun. 17, 2021

(65) Prior Publication Data
US 2023/0294289 A1    Sep. 21, 2023

(51) Int. Cl.
*B25J 13/08* (2006.01)
*B25J 9/16* (2006.01)

(52) U.S. Cl.
CPC ........ *B25J 9/1674* (2013.01); *B25J 13/084* (2013.01)

(58) Field of Classification Search
CPC ...... B25J 9/1676; B25J 9/1674; B25J 9/1666; B25J 13/084
See application file for complete search history.

(56) References Cited

U.S. PATENT DOCUMENTS 5,798,627 A * 8/1998 Gilliland ............ B25J 9/1671
318/568.14
11,945,118 B2 * 4/2024 Masaoka ............ B25J 9/1666
(Continued)

FOREIGN PATENT DOCUMENTS

CN    102506822 A    6/2012
CN    105082184 A    11/2015
(Continued)

OTHER PUBLICATIONS

International Search Report of PCT/CN2019/125118.

*Primary Examiner* — Dalena Tran

(57) ABSTRACT

A safety apparatus is used to be arranged at a movable member of automatic device and is communicatively connected to a controller of the automatic device. The safety apparatus includes a contact detector and a module. The contact detector is for detecting a contact event of the safety apparatus, and outputting a contact signal. The module includes a first input terminal, a second input terminal and an output terminal. The first input terminal is communicatively connected to the contact detector, and is for receiving the contact signal. The second input terminal is communicatively connected to the output terminal, and is capable of communicatively connecting to an output terminal of another safety apparatus. The output terminal is communicatively connected to the first input terminal, and is for outputting an output signal when the first input terminal receives the contact signal. Upon receiving the output signal from the output terminal, the controller changes a motion state of the movable member of the automatic device.

19 Claims, 4 Drawing Sheets

(56) References Cited

U.S. PATENT DOCUMENTS

| | | | |
|---|---|---|---|
| 2010/0114373 A1 | 5/2010 | Hale et al. | |
| 2019/0160675 A1* | 5/2019 | Paschall, II | G05D 1/617 |
| 2021/0138649 A1* | 5/2021 | Baer | B25J 9/1669 |

FOREIGN PATENT DOCUMENTS

| | | |
|---|---|---|
| CN | 105751216 A | 7/2016 |
| CN | 107063522 A | 8/2017 |

\* cited by examiner

AUTOMATIC DEVICE AND SAFETY APPARATUS THEREOF

CROSS-REFERENCE TO RELATED APPLICATION

This application is the US national phase of international application No. PCT/CN2019/125118 filed on Dec. 13, 2019, the entire contents of which are hereby incorporated by reference.

BACKGROUND OF THE INVENTION

1. Field of the Invention

The present disclosure relates to a safety apparatus of automatic device, and in particular to an automatic device safety apparatus for detecting collisions.

2. Description of the Related Art

The safety issue of automatic device is a center of attention along with the development of automatic device. For example, safety mechanisms of collaboration robots that operate closely to operating staff on production lines have become a critical task. Regarding the above, the International Organization for Standardization launched ISO/TS 16066, which defines further safety regulations for collaborative robots in robotic devices.

A contact detection mechanism is one of the safety mechanisms for automatic device. With an additional contact detection mechanism provided, automatic device can timely take reactive measures upon detection of a contact event. For example, referring to FIG. 1, a piece of automatic device 1 having a contact detection mechanism employed as a collaborative robot includes a controller 11, a movable member 12, multiple contact detectors 13, and multiple signal lines 14 connected to the contact detectors 13 and the controller 11. The movable member is a movable mechanical arm of the robot, and is capable of rotating in response to the control of the controller. Upon detecting a contact event by the contact detectors 13, the controller 11 learns the contact event through the signal lines 14 and changes a motion state of the mechanical arm 12, for example, terminating the rotation in real time, so as to prevent the movement of the collaborative robot 1 from harming collaborative operating staff.

BRIEF SUMMARY OF THE INVENTION

In the above prior art, the multiple contact detectors are connected to the controller through the signal lines. However, some of the signal lines may be longer in length, and may be pulled by the movable member or operating staff. Moreover, the controller needs to be provided with multiple input ports. The above issues result in a more configuration complications in the overall safety mechanism, and increase the risks of failures of the safety mechanism.

In view of the above, it is an object of the present disclosure to provide a safety apparatus that simplifies the configuration of the overall safety mechanism, so as to reduce the risks of failures of the safety mechanism.

To achieve the above object, the safety apparatus provided by the present disclosure is used to be arranged at a movable member of automatic device and is communicatively connected to a controller of the automatic device. The safety apparatus includes a contact detector and a module. The contact detector is for detecting a contact event of the safety apparatus, and outputting a contact signal. The module includes a first input terminal, a second input terminal and an output terminal. The first input terminal is communicatively connected to the contact detector, and is for receiving the contact signal. The second input terminal is communicatively connected to the output terminal, and is capable of communicatively connecting to an output terminal of another safety apparatus. The output terminal is communicatively connected to the first input terminal, and is for outputting an output signal when the first input terminal receives the contact signal. Upon receiving the output signal from the output terminal, the controller changes a motion state of the movable member of the automatic device.

The present disclosure further provides a piece of automatic device including a controller, a movable member signally connected to the controller, and a plurality of the safety apparatuses mentioned above. The safety apparatuses are sequentially cascaded to one another through signal lines, wherein an output terminal of one of the safety apparatuses is communicatively connected to the controller, and an output terminal of one of the remaining safety apparatuses is communicatively connected to a second input terminal of the next safety apparatus. Upon receiving the output signal from the output terminal of the one safety apparatus among the safety apparatuses, the controller changes a motion state of the movable member.

In one embodiment, the contact detector of the safety apparatus includes two film layers, two electrode layers, at least one sensing layer and a gap layer. The two film layers have a first inner surface and a second inner surface opposite to each other. The two electrode layers are arranged on the first inner surface and the second inner surface, respectively, and the two electrode layers are spaced by a gap. The sensing layer is arranged on the two electrode layers. The gap layer is arranged between the two film layers to maintain the gap between the two electrode layers.

In one embodiment, the safety apparatus further includes an indicator component, which is communicatively connected to the module and operates when the output terminal outputs the output signal. The indicator component can be a light emitting component, and the module of the safety apparatus can further include two parallel-connected output switches connected in series between the first input terminal and the indicator component.

In one embodiment, the second input terminal is shorted in a loop. The output signal is an on/off signal. The motion state includes a stop state.

In one embodiment, the module of the safety apparatus further includes two parallel-connected determination circuits and two parallel-connected output switches. The two parallel-connected determination circuits are communicatively connected to the first input terminal, and are for determining whether the contact signal is greater than a threshold, and outputting a determination signal when the contact signal is greater than the threshold. The two parallel-connected output switches are connected in series between the two parallel-connected determination circuits and the output terminal, and use and output the determination signal as the output signal from the output terminal.

In one embodiment, the automatic device further includes an intermediate device, which is connected in series between the safety apparatus and the controller, includes two parallel-connected output switches, and receives the output signal and outputs the output signal to the controller.

In conclusion, since the safety apparatuses can be connected to one another by signal lines in between, only the output terminal of one safety apparatus, for example, the safety apparatus closest to the controller, needs to be connected to the controller. Therefore, the overall length of the signal lines can be decreased and the configuration is kept simple, thereby reducing the risks of failures of the overall safety mechanism.

DETAILED DESCRIPTION OF THE INVENTION

To facilitate understanding of the object, characteristics and effects of this present disclosure, embodiments together with the attached drawings for the detailed description of the present disclosure are provided.

Figure 1:
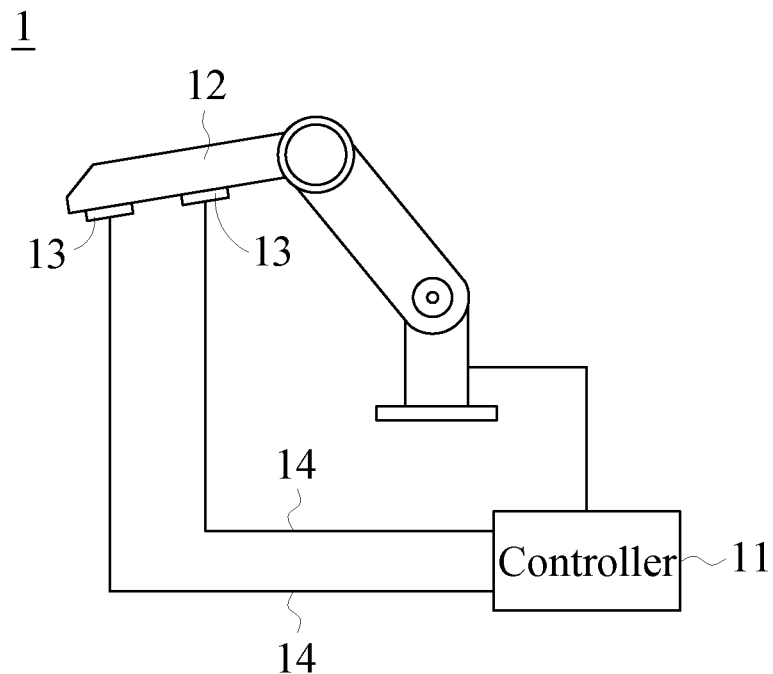
FIG. 1 is current automatic device having a contact detection mechanism.
Figure 2:
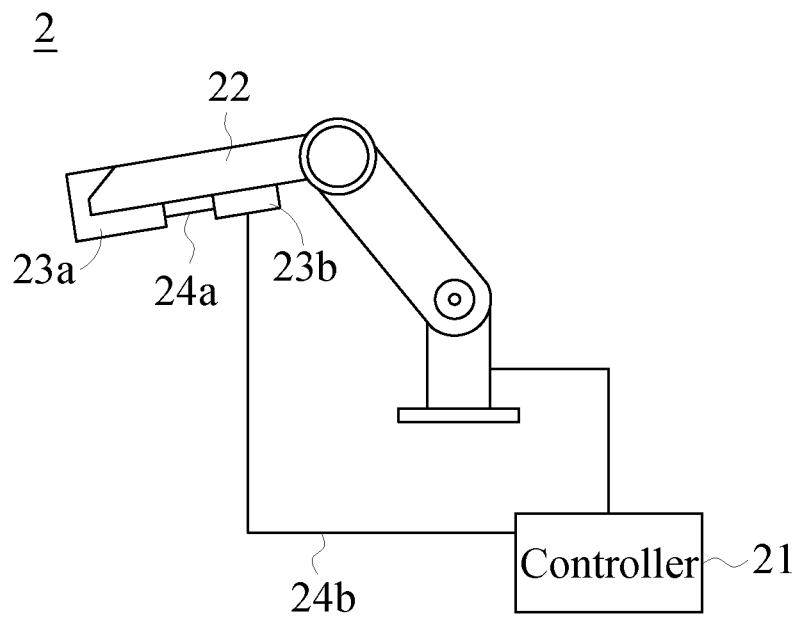
FIG. 2 depicts automatic device including a safety apparatus according to an embodiment of the present disclosure.

Referring to FIG. 2, a piece of automatic device 2 according to an embodiment of the present disclosure includes a controller 21, a movable member 22, two safety apparatuses 23a and 23b, a first signal line 24a connecting the safety apparatuses 23a and 23b, and a signal line 24b connecting the safety apparatus 23b and the controller 21. The movable member is a movable mechanical arm, and is capable of rotating in response to the control of a controller.

In this embodiment, the safety apparatuses 23a and 23b are not connected to the controller 21 through respective signal lines as those of the prior art. More specifically, a direct signal connection target of the safety apparatus 23a is the safety apparatus 23b but not the controller 21. Between the two safety apparatuses, a direct signal connection target of only the safety apparatus 23b is the controller 21. On the basis of the above configuration, the safety apparatus 23a only needs to be connected to the other safety apparatus 23b, and is not necessarily connected to the controller 21 that is at a more distal end. The safety apparatus that is connected to the controller 21 is the safety apparatus 23b closer to the controller 21. Thus, the overall length of the signal lines can be decreased, hence reducing the risks of failures of the signal lines caused by pulling. Moreover, the controller 21 needs only one signal port in order to connect all the safety apparatuses, further reducing configuration complications of the safety apparatuses.

Figure 3:
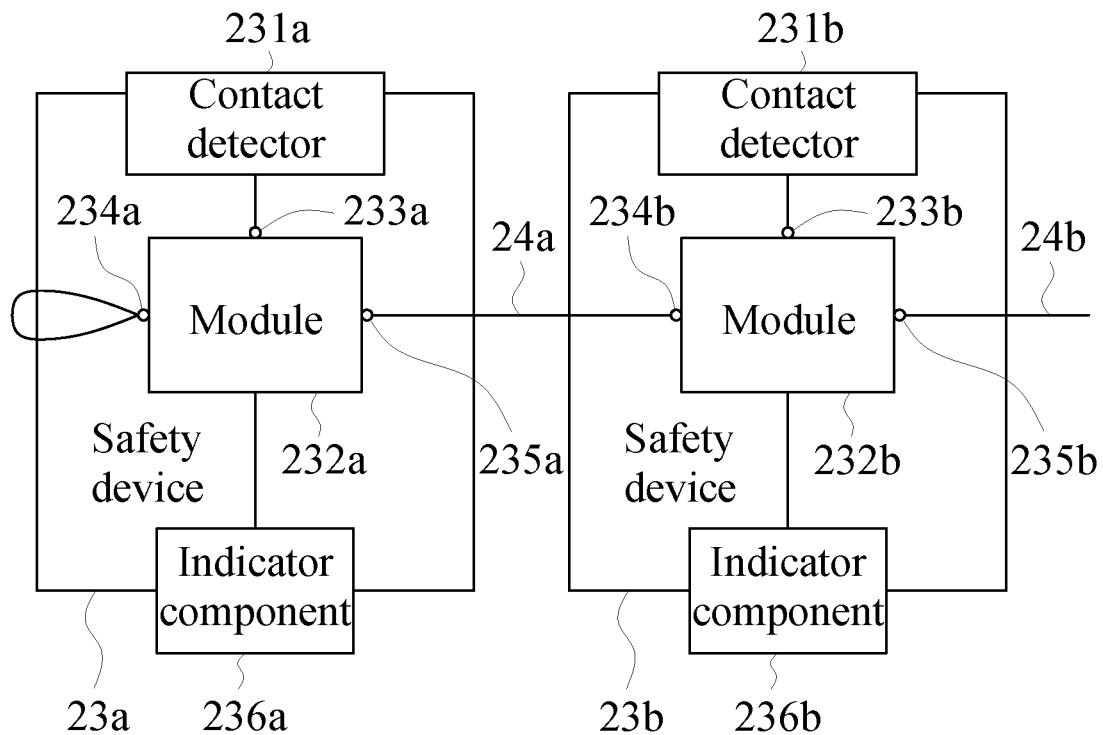
FIG. 3 is a function block diagram of two safety apparatuses according to an embodiment of the present disclosure.

Referring to FIG. 3, the safety apparatus 23a includes a contact detector 231a, a module 232a and an indicator component 236a. The module 232a includes a first input terminal 233a, a second input terminal 234a and an output terminal 235a. The safety apparatus 23b includes a contact detector 231b, a module 232b and an indicator component 236b. The module 232b includes a first input terminal 233b, a second input terminal 234b and an output terminal 235b.

The first input terminal 233a of the module 232a is communicatively connected to the contact detector 231a, the second input terminal 234a is shorted in a loop to simulate that the second input terminal 234a is connected to the other safety apparatus, and the output terminal 235a is connected to the signal line 24a. The first input terminal 233b of the module 232b is communicatively connected to the contact detector 231b, the second input terminal 234b is connected to the signal line 24a, and the output terminal 235b is connected to the signal line 24b.

Upon receiving a contact, the contact detector 231a of the safety apparatus 23a outputs a contact signal to the first input terminal 233a, and then the output terminal 235a of the module 232a outputs an output signal to the signal line 24a and transmits the output signal to the second input terminal 234b of the safety apparatus 23b through the signal line 24a. Once the second input terminal 234b receives the output signal from the signal line 24a, the output terminal 235b of the module 232b also outputs an output signal to the signal line 24b so that the controller 21 receives the output signal.

Upon receiving the output signal, the controller 21 changes a motion state of the movable member 22 of the automatic device 2. For example, assume that the movable member 22 was originally performing a rotation motion from top to bottom. Once a contact is received by the contact detector 231a of the safety apparatus 23a, the controller 21 having received the output signal immediately terminates the motion of the movable member 22, so as to ensure safety of the automatic device 2, operating staff in the vicinity or other targets.

Once the contact detector 231a of the safety apparatus 23a receives a contact and outputs an output signal, the module 232a also at the same time actuates the indicator component 236a to allow operating staff to learn to whether the safety apparatus 23a has been contacted. In this embodiment, the indicator component 236a can be a light emitting device. The indicator component 236a can also be other devices such as a beeper, and is not limited to the example of a light emitting device.

Upon receiving a contact, the contact detector 231b of the safety apparatus 23b outputs a signal to the first input terminal 233b, and the output terminal 235b of the module 232b outputs an output signal to the signal line 24b, so that the controller 21 receives the output signal. Similarly, upon receiving the output signal, the controller 21 changes a motion state of the movable member 22 of the automatic device 2, so as to ensure staff and device safety.

Similarly, when the contact detector 231b of the safety apparatus 23b receives a contact and outputs an output signal, the module 232b also at the same time actuates the indicator component 236b to allow operating staff to learn to whether the safety apparatus 23b has been contacted. In this embodiment, the indicator component 236b can be a light emitting device, or other devices such as a beeper.

Figure 4:
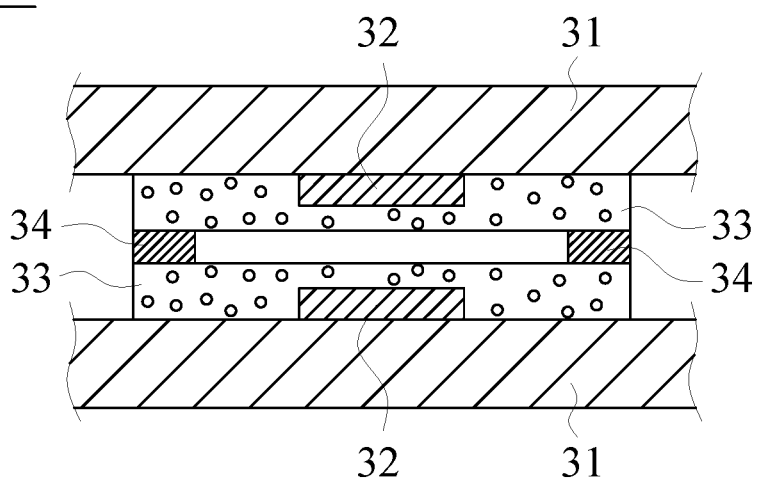
FIG. 4 depicts a structure of a contact detector according to an embodiment of the present disclosure.

Referring to FIG. 4, in this embodiment, the contact detector 231a and the contact detector 231b are identically structured, and each include two film layers 31, two electrode layers 32, two sensing layers 33 and a gap layer 34. The two film layers 31 can be made of a soft material, and have a first inner surface 31a and a second inner surface 31b opposite to each other. The two electrode layers 32 are arranged on the first inner surface 31a and the second inner surface 31b, respectively, and the two electrode layers 32 are spaced by a gap G. The two sensing layers 33 can be made of a pressure sensitive material including an electrically conductive material, and be formed on the two electrode layers 32 by means of coating or printing. The gap layer 34 is arranged between the two film layers 31 to maintain the gap between the two electrode layers 32. When the film layers 31 are contacted, the distance between the two electrode layers 32 is decreased, and the pressure sensitive material of the sensing layers 33 receives a pressure, such that the electrically conductive material in the pressure sensitive material is contacted to form a conduction path between the two electrode layers 32 to thereby output a signal.

Figure 5:
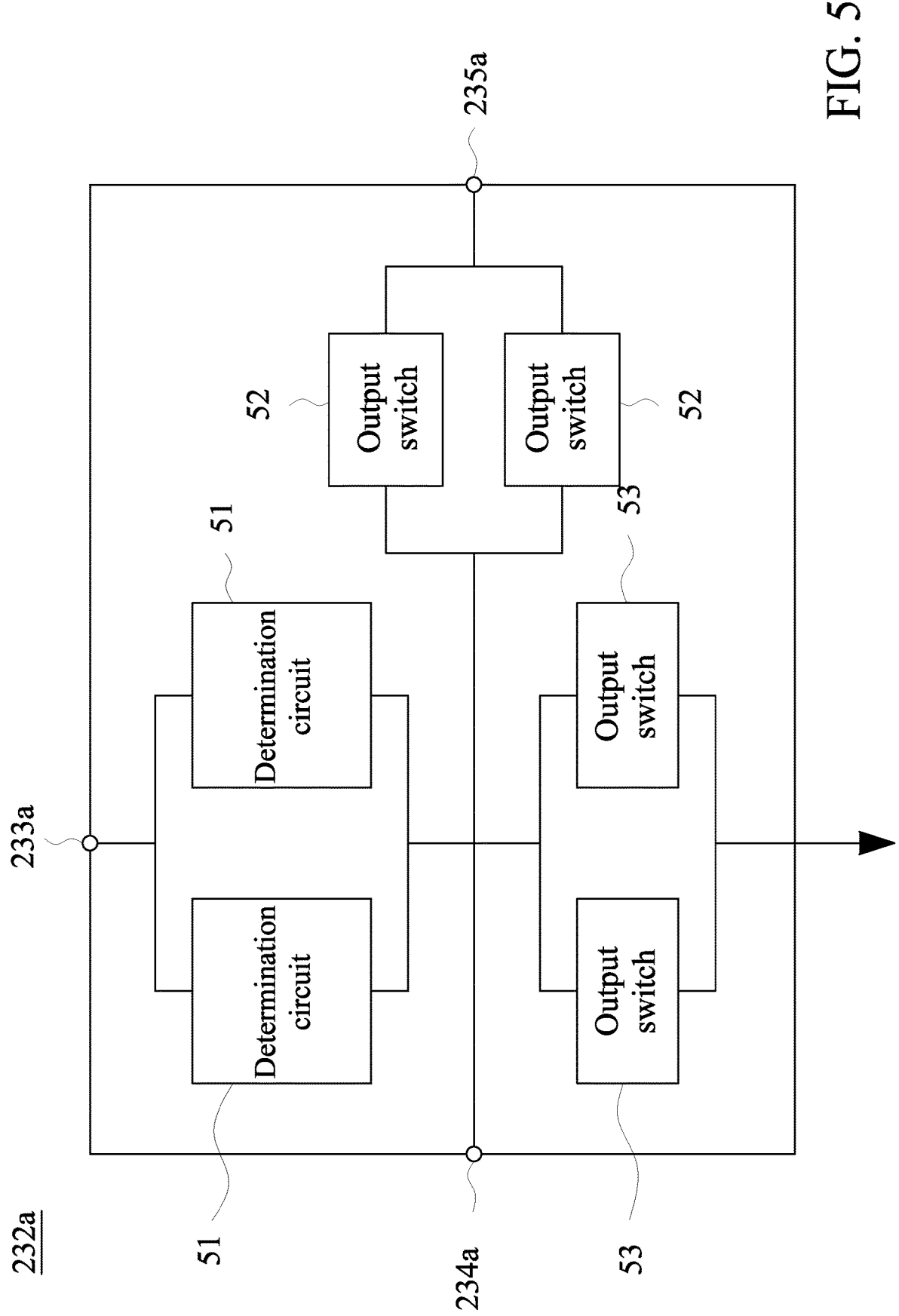
FIG. 5 is a function block diagram of a safety apparatus according to an embodiment of the present disclosure.

Referring to FIG. 5, in this embodiment, the modules 232a and 232b are identically designed, and each include two parallel-connected determination circuits 51, two parallel-connected output switches 52 and two parallel-connected output switches 53. The determination circuits 51 receive the contact signal input by the contact detector 231a through the first input terminal 233a, and output a determination signal to the output switches 52 and the output switches 53 when the contact signal is greater than a threshold. The output switches 52 use the determination signal as an output signal, and output the output signal from the output terminal 235a. The output switches 53 actuate the indicator component 236a according to this signal. The determination circuits 51, the output switches 52 and the output switches 53 adopt the design concept of redundancy circuit of two devices connected in parallel, so as to ensure zero operation failure of the entire safety apparatus.

In this embodiment, the output signal is an on/off signal, but is not a complex signal such as a signal that carries communication packet data. In the modules 232a and 232b, components needed for numerical operations, for such processors or memories, are not used. Therefore, the safety apparatus 23a or 23b is insusceptible to malfunction. Moreover, when the safety apparatus 23a or 23b is touched, the controller 21 can immediately change the motion state of the automatic device 2. Such design significantly increases a response speed of the safety apparatus, and ensures zero operation failure of the entire safety apparatus.

Moreover, the number of safety apparatuses of this embodiment can be increased. To increase the number of safety apparatuses in addition to the safety apparatuses 23a and 23b, only signals lines are needed to connect the newly added safety apparatuses between the safety apparatuses 23a and 23b. That is, the output terminal 235a of the safety apparatus 23a is connected to a second input terminal of the newly added device instead, and the second input terminal 234b of the safety apparatus 23b is connected to an output terminal of the newly added safety apparatus instead. The similar method can be used to cascade more safety apparatuses so as to have multiple safety apparatuses to be cascaded to one another, wherein an output terminal of one of the safety apparatuses is communicatively connected to the controller, and an output terminal of one of the remaining safety apparatuses is communicatively connected to a second input terminal of the next safety apparatus.

Figure 6:
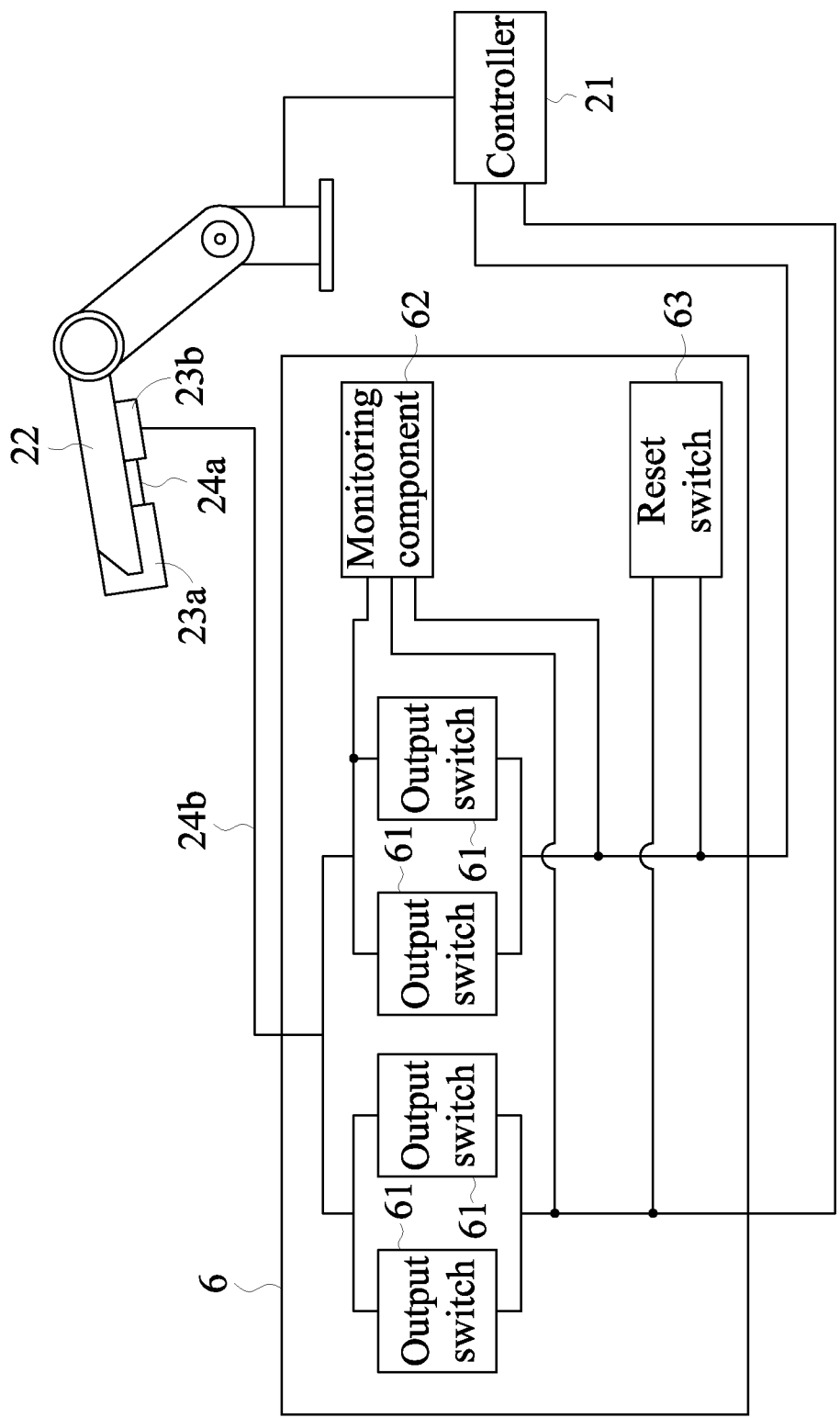
FIG. 6 depicts another embodiment of the present disclosure, further including an intermediate device.

Referring to FIG. 6, in another embodiment, the signal line 24b can be first connected to the intermediate device 6, which is then connected to the controller 21. In other words, the intermediate device 6 is a connected in series between the output terminal of the safety apparatus 23b and the controller 21, and the safety apparatus 23b is indirectly connected to the controller 21 through the intermediate device 6.

The intermediate device 6 can include two sets of parallel-connected output switch 61, a monitoring component 62 and a reset switch 63. The two sets of output switches 61 receive and output the output signal to the controller 21, and employs a design concept of a redundancy circuit of two devices connected in parallel, so as to ensure two operations failure. Moreover, in this embodiment, the output switches 61 are connected to an emergency stop switch of the controller 21. Because the emergency stop switch of the controller 21 needs two inputs, with the two outputs provided by the output switches 61, safety can be ensured to prevent erroneous triggering of the emergency stop switch. The monitoring components 62 can be contact points that can be connected to, for example, a light emitting component or a beeper, are turned off in normal conditions, and are actuated such as lighting a lamp or issuing a beeping sound in case of power-off caused anomaly such as a disconnection, so as to remind operating staff of the occurrence of the anomaly. The reset switches 63 can also be contact points that are connected to physical switches, and facilitate operating staff to reset a state to the motion state of the automatic device 2 before a change in the motion state, such as being stopped, caused by a touch of the safety apparatus 23a or 23b.

According to the above embodiments of the present disclosure, the safety apparatuses can be connected to one another by signal lines in between, only the output terminal of one safety apparatus, for example, the safety apparatus closest to the controller, is selected and connected to the controller. Therefore, the overall length of the signal lines can be decreased and the configuration is kept simple, thereby reducing the risks of failures of the overall safety mechanism.

The present disclosure is disclosed by ways of preferred embodiments in the description above. However, it is to be understood by a person skilled in the art that the embodiments are merely for describing the present disclosure, and are not to be construed as limitations to the scope of the present disclosure. It should be noted that, all equivalent modifications and substitutions made to the embodiments are to be encompassed within the scope of the present disclosure. Therefore, the scope of protection of the present disclosure is to be accorded with the definition of the appended claims.

What is claimed is:

1. A safety apparatus, for being arranged at a movable member of automatic device and being communicatively connected to a controller of the automatic device, the safety apparatus comprising:
    a contact detector, for detecting a contact event of the safety apparatus, and outputting a contact signal; and
    a module, comprising:
        a first input terminal, communicatively connected to the contact detector, for receiving the contact signal;
        an output terminal, communicatively connected to the first input terminal, for outputting an output signal when the first input terminal receives the contact signal;
        a second input terminal, communicatively connected to the output terminal, being capable of communicatively connecting to an output terminal of another safety apparatus;
        two parallel-connected determination circuits, communicatively connected to the first input terminal, for determining whether the contact signal is greater than a threshold, and outputting a determination signal when the contact signal is greater than the threshold; and
        two parallel-connected output switches, connected in series between the two parallel-connected determination circuits and the output terminal, using and outputting the determination signal as the output signal from the output terminal,
    wherein upon receiving the output signal from the output terminal, the controller changes a motion state of the movable member of the automatic device.

2. The safety apparatus according to claim 1, wherein the contact detector comprises:
- two film layers, having a first inner surface and a second inner surface opposite to each other;
- two electrode layers, arranged on the first inner surface and the second inner surface, respectively, the two electrode layers being spaced by a gap;
- at least one sensing layer, arranged on at least one of the two electrode layers; and
- a gap layer, arranged between the two film layers to maintain the gap between the two electrode layers.

3. The safety apparatus according to claim 2, wherein the at least one sensing layer comprises a pressure sensitive material covering one of the two electrode layers, and the pressure sensitive material comprises at least one electrically conductive substance.

4. The safety apparatus according to claim 1, further comprising:
- an indicator component, communicatively connected to the module, and operating when the output terminal outputs the output signal.

5. The safety apparatus according to claim 4, wherein the indicator component is a light emitting component.

6. The safety apparatus according to claim 4, wherein the module further comprises:
- two parallel-connected output switches, connected in series between the first input terminal and the indicator component.

7. The safety apparatus according to claim 1, wherein the second input terminal is shorted in a loop.

8. The safety apparatus according to claim 1, wherein the output signal is an on/off signal.

9. The safety apparatus according to claim 1, wherein the motion state comprises a stop state.

10. A piece of automatic device, comprising:
- a controller;
- a movable member, communicatively connected to the controller;
- a plurality of safety apparatuses, each of the plurality of safety apparatuses comprising:
  - a contact detector, for detecting a contact event of the safety apparatus, and outputting a contact signal; and
  - a module, comprising:
    - a first input terminal, communicatively connected to the contact detector, for receiving the contact signal;
    - an output terminal, communicatively connected to the first input terminal, for outputting an output signal when the first input terminal receives the contact signal;
    - a second input terminal, communicatively connected to the output terminal, being capable of communicatively connecting to an output terminal of another safety apparatus among the plurality of safety apparatuses;
    - two parallel-connected determination circuits, communicatively connected to the first input terminal, for determining whether the contact signal is greater than a threshold, and outputting a determination signal when the contact signal is greater than the threshold; and
    - two parallel-connected output switches, connected in series between the two parallel-connected determination circuits and the output terminal, using and outputting the determination signal as the output signal from the output terminal,
- wherein the plurality of safety apparatuses are sequentially cascaded to one another, wherein an output terminal of one of the safety apparatuses is communicatively connected to the controller, an output terminal of one of the remaining safety apparatuses is communicatively connected to the second input terminal of the next safety apparatus, and upon receiving the output signal from the output terminal of the one safety apparatus among the plurality of safety apparatuses, the controller changes a motion state of the movable member of the automatic device.

11. The automatic device according to claim 10, wherein the contact detector of each of the plurality of safety apparatuses comprises:
- two film layers, having a first inner surface and a second inner surface opposite to each other;
- two electrode layers, arranged on the first inner surface and the second inner surface, respectively, the two electrode layers being spaced by a gap;
- at least one sensing layer, arranged on at least one of the two electrode layers; and
- a gap layer, arranged between the two film layers to maintain the gap between the two electrode layers.

12. The automatic device according to claim 11, wherein the at least one sensing layer comprises a pressure sensitive material covering one of the two electrode layers, and the pressure sensitive material comprises at least one electrically conductive substance.

13. The automatic device according to claim 10, wherein each of the plurality of safety apparatuses further comprises:
- an indicator component, communicatively connected to the module, and operating when the output terminal outputs the output signal.

14. The automatic device according to claim 13, wherein the indicator component is a light emitting component.

15. The automatic device according to claim 13, wherein the module of each of the plurality of safety apparatuses further comprises:
- two parallel-connected output switches, connected in series between the first input terminal and the indicator component.

16. The automatic device according to claim 10, wherein the second input terminal of one safety apparatus among the plurality of safety apparatuses is shorted in a loop.

17. The automatic device according to claim 10, wherein the output signal is an on/off signal.

18. The automatic device according to claim 10, wherein the motion state comprises a stop state.

19. The automatic device according to claim 10, further comprising:
- an intermediate device, connected in series between the plurality of safety apparatuses and the controller, comprising two sets of parallel-connected output switches, and receiving the output signal and outputting the output signal to the controller.

* * * * *